(12) United States Patent  (10) Patent No.: US 7,779,516 B2
Morris  (45) Date of Patent: Aug. 24, 2010

(54) CABLE CLAMP

(75) Inventor: Stephen James Morris, Cheltenham (GB)

(73) Assignee: ADC GmbH, Berlin (DE)

( * ) Notice: Subject to any disclaimer, the term of this patent is extended or adjusted under 35 U.S.C. 154(b) by 368 days.

(21) Appl. No.: 11/821,541

(22) Filed: Jun. 22, 2007

(65) Prior Publication Data

US 2008/0098571 A1    May 1, 2008

Related U.S. Application Data

(60) Provisional application No. 60/816,005, filed on Jun. 23, 2006.

(51) Int. Cl.
*F16L 3/22*    (2006.01)

(52) U.S. Cl. ..................... 24/16 R; 248/74.1; 248/74.4

(58) Field of Classification Search .................. None
See application file for complete search history.

(56) References Cited

U.S. PATENT DOCUMENTS

| 3,147,754 | A | * | 9/1964 | Koessler ..................... 128/885 |
| 5,243,139 | A | | 9/1993 | Law |
| 5,675,128 | A | | 10/1997 | Simon |
| 6,126,122 | A | | 10/2000 | Ismert |
| 6,206,331 | B1 | | 3/2001 | Keith et al. |
| 6,398,169 | B1 | | 6/2002 | Streit |
| 6,463,631 | B2 | | 10/2002 | Noda |
| 6,516,498 | B2 | * | 2/2003 | LaCoy et al. ................ 24/16 R |
| 6,595,472 | B1 | | 7/2003 | Pisczak |
| 7,223,918 | B2 | | 5/2007 | Gelibert |

FOREIGN PATENT DOCUMENTS

AT  221618  6/1962
DE  679 938  8/1939

* cited by examiner

*Primary Examiner*—Jack W. Lavinder
(74) *Attorney, Agent, or Firm*—Merchant & Gould P.C.

(57) ABSTRACT

A cable clamp having a retainer component and a plunger component. The plunger component includes serrated prongs that insert within slots formed in the retainer component.

14 Claims, 1 Drawing Sheet

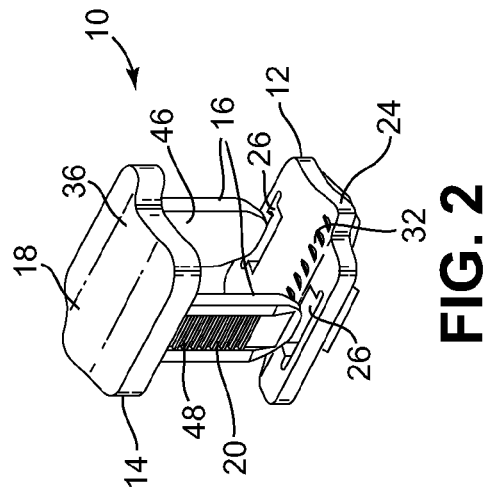
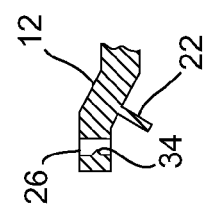
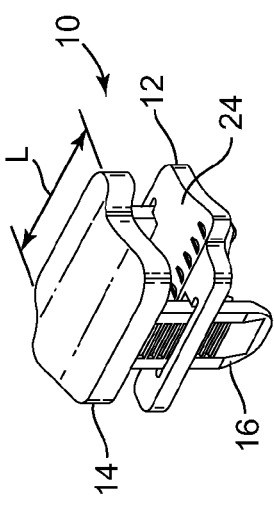
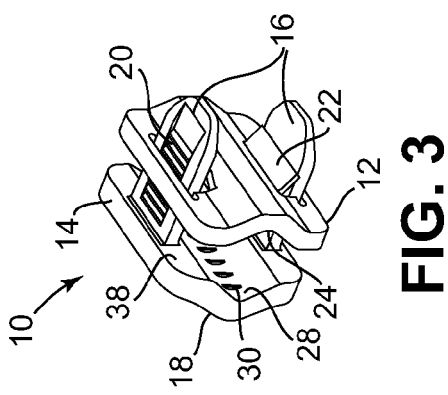

CABLE CLAMP

CROSS REFERENCE TO RELATED APPLICATIONS

This application claims the benefit of U.S. Provisional Application No. 60/816,005, filed Jun. 23, 2006; which application is incorporated herein by reference.

TECHNICAL FIELD

The present disclosure relates generally to devices for use in the telecommunications industry, and various methods associated with such devices. More particularly, this disclosure relates to devices and methods for managing cables.

BACKGROUND

A wide variety of telecommunication systems utilized termination panels. In some arrangements, data cables are terminated at termination regions of the panels. The terminated cables are often retained with cable ties. The cables ties are secured relative to the panel by lacing the cable tie through an aperture formed in the panel.

A number of problems arise with the use of cable ties for retaining data cables. If the cable ties are too tight, the cable tie creates a pinch point, which is undesirable especially in high frequency data cables. If the cable is too loose, the cables are susceptible to movement, which can also cause cable damage. In addition, if maintenance of the cables is required, the technician is required to cut the cable ties and subsequently re-lace a new cable tie to the panel, which can be time consuming.

In general, improvement has been sought with respect to such devices and methods.

SUMMARY

The present disclosure relates to cable clamp that manages and organizes data cables in a telecommunications system. A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 1 is a top perspective view of a cable clamp, according to the principles of the present disclosure;

FIG. 2 is an exploded top perspective view of the cable clamp of FIG. 1;

FIG. 3 is a bottom perspective view of the cable clamp of FIG. 1;

FIG. 4 is a front elevation view of the cable clamp of FIG. 1; and

FIG. 5 is a cross-sectional view of a portion of the cable clamp of FIG. 5.

DETAILED DESCRIPTION

Reference will now be made in detail to various features of the present disclosure that are illustrated in the accompanying drawings. Wherever possible, the same reference numbers will be used throughout the drawings to refer to the same or like parts.

FIG. 1 illustrates one embodiment of a cable clamp 10 used in organizing cables of a telecommunication system. The telecommunication system can include, for example, a patch panel that secures to a rack or frame. Systems including other types of panels and equipment, and other types of frame structures, such as cabinets and wall boxes, can benefit from the features of the disclosed cable clamp 10.

In one application, the present cable clamp 10 is utilized to control and manage terminated cables located at the rear of a patch panel. The cable clamp 10 is designed to minimize cable pinch points and improve installation time, as compared to conventional cable ties.

In the illustrated embodiment, the cable clamp 10 generally consists of two components: a lower part referred to as a retainer 12, and an upper part referred to as a plunger 14.

The lower part or retainer 12 can be provided as an individual component that is affixed to a panel. Multiple banks or arrays of retainers 12 can be affixed to the panel to provide a variety of cable management solutions. In the alternative, the retainer 12 can be formed as an integral part or portion of the panel itself, and provided in multiple banks and arrays adjacent to or at the rear of the panel. The upper part or plunger 14 is provided as a separate individual component (see FIG. 2) that secures to the retainer 12 to retain a cable in a fixed manner. The retainer 12 is spaced a distance D (FIG. 4) from the plunger 14 when the two components are interconnected. As will be understood, the distance D between the two components is adjustable to accommodate a variety of cable sizes.

Referring to FIG. 2, the plunger 14 of the cable clamp 10 includes two prongs 16 and a cap piece 18. The cap piece 18 has a top side 36 and a bottom side 38 (FIG. 3). A central recess 28 is formed in the bottom side 38 of the cap piece 18. The two prongs 16 of the plunger 14 extend downward from the bottom side 38 of the cap piece 18. The prongs 16 each have an interior side 46 (FIG. 2) and an exterior side 48. Multiple gripping teeth or serrations 20 are located along a length of the exterior side 48 of the prong 16. The multiple gripping teeth 20 compensate for different cable sizes and variations in sheath material of a cable.

The retainer 12 of the cable clamp 10 defines two longitudinal slots 26 that correspond in size to the prongs 16 of the plunger 14. The slots 26 extend through the retainer from a top side 42 (FIG. 4) to a bottom side 44. The two slots 26 are positioned along opposite sides of a central recess 24 formed in the top side 42 of the retainer 12.

Referring to FIG. 5, the retainer 12 includes retaining structure 34 located within or adjacent to each longitudinal slot 26. The retaining structure 34 may include, for example, one or more protrusions corresponding in size to the serrations or gripping teeth 20 of the prongs 16. The retaining structure 34 works in conjunction with the gripping teeth 20 of the plunger 14 to lock the two cable clamp components in a position relative to one another. Referring to FIG. 4, flexible retaining clips 22 are provided on the retainer 12. The flexible retaining clips 22 function as springs to bias the prongs 16 outward to ensure that there is proper locking engagement between the teeth 20 of the prongs 16 and the retaining structure 34.

In use, a cable (e.g., 40 schematically represented in FIG. 4) is placed across the retainer 12 and within the central recess 24. The central recess 24 of the retainer 12 has a curved formation to aid in positioning the cable. The prongs 16 of the plunger 14 are inserted within the slots 26 formed in the retainer 12. The plunger 14 is then easily and quickly pushed toward the retainer 12 to secure the cable 40 in place. In general, pushing down on the plunger 14 activates engagement between the retaining structure 34 and the gripping teeth 20 of the cable clamp so that the cable 40 is clamped and secured between the retainer 12 and the plunger 14. The retaining clips 22 of the retainer 12 are positioned to bias the prongs 16 outward to ensure locking engagement is established between the gripping teeth 20 and the retaining structure 34.

Referring to FIGS. 3 and 4, as previously described, the central recess 24 of the retainer 12 aids in positioning (i.e., centering) the cable 40 within the clamp 10. The central recess 28 of the plunger 14 similarly aids in positioning the cable. In the illustrated embodiment, ridges 30, 32 (see also FIG. 2) are provided in each of the recesses 24, 28 of the retainer 12 and the plunger 14 to prevent cable slip.

The retainer 12 and the plunger 14 of the present cable clamp 10 are shaped and sized to maximize load distribution and minimize cable pinch. The present cable clamp thereby reduces the occurrence of cable damage, as compared to conventional cable ties. In particular, each of the retainer 12 and the cap piece 18 of the plunger 14 have a broadened length L (FIG. 1) and width W (FIG. 4) that reduce load and cable pinch on a cable.

To access or remove a cable from the present cable clamp 10, the prongs 16 of the plunger 14 are simply biased or pinched together. The flexible retaining clips 22 are designed to accommodate such prong movement. When the prongs 16 are biased toward one another, the gripping teeth 20 of the prongs 16 disengage from the retaining structure 34 of the retainer 12. The plunger 14 can then be removed from the slots 26 and the cable accessed. The prongs 16 can be biased toward one another by hand or by a tool.

The above specification provides a complete description of the present invention. Since many embodiments of the invention can be made without departing from the spirit and scope of the invention, certain aspects of the invention reside in the claims hereinafter appended.

What is claimed is:

1. A cable clamp, comprising:
 a) a retainer including a central recess having a curved formation and first and second longitudinal slots extending along side the central recess, the retainer further including retaining structure located in relation to each of the first and second longitudinal slots; and
 b) a plunger including a cap piece and first and second prongs depending from the cap piece, the cap piece including a central recess having a curved formation, the first and second prongs each including a plurality of teeth formed along a length of the prong, wherein each prong has an interior side that faces the interior side of the other prong, and an exterior side opposite the interior side;
 c) wherein the retaining structure of the retainer engage the teeth of the first and second prongs when the prongs are inserted within the longitudinal slots of the retainer, the engagement between the retaining structure and the teeth providing an interlocking connection that secures a cable between the retainer and the plunger;
 d) wherein the retainer further includes flexible clips that bias each prong of the plunger in an outward direction opposite the interior side of the prong, and wherein each prong is biased toward the retaining structure.

2. The cable clamp of claim 1, wherein the plurality of teeth is located on the exterior side of each prong.

3. The cable clamp of claim 1, wherein each of the retainer and the plunger has a top side and a bottom side, the central recess of the retainer being formed in the top side of the retainer, the central recess of the plunger being formed in the bottom side of the plunger.

4. The cable clamp of claim 3, wherein each of the central recesses of the retainer and the plunger includes ridges that prevent cable slip.

5. The cable clamp of claim 1, wherein the retainer is spaced a distance from the cap piece when the plunger and retainer are interconnected, the distance being adjustable to accommodate a variety of cable sizes.

6. The cable clamp of claim 1, wherein the prongs are inserted within the longitudinal slots in a first direction, and wherein the prongs are removable from the longitudinal slots in a second direction opposite the first direction.

7. A cable clamp, comprising:
 a) a retainer including a central recess having a curved formation, the retainer defining first and second longitudinal slots extending along side the central recess, the retainer further including retaining structure located in relation to each of the first and second longitudinal slots; and
 b) a plunger including a cap piece and first and second prongs depending from the cap piece, the cap piece including a central recess having a curved formation, the first and second prongs each including a plurality of teeth formed only on one side of the prong;
 c) wherein the retaining structure of the retainer engage the teeth of the first and second prongs when the prongs are inserted within the longitudinal slots of the retainer, the engagement between the retaining structure and the teeth providing an adjustable interlocking connection that secures a cable within and between each of the central recesses of the retainer and the plunger;
 d) wherein the retainer includes flexible clips that bias the prongs of the plunger in a direction toward the retaining structure.

8. The cable clamp of claim 7, wherein each of the central recesses of the retainer and the plunger includes ridges that prevent cable slip.

9. The cable clamp of claim 7, wherein the adjustable interlocking connection accommodates a variety of cable sizes.

10. The cable clamp of claim 7, wherein the prongs are inserted within the longitudinal slots in a first direction, and wherein the prongs are removable from the longitudinal slots in a second direction opposite the first direction.

11. The cable clamp of claim 7, wherein the one side of each of the first and second prongs is an exterior side opposite an interior side.

12. The cable clamp of claim 7, wherein the flexible clips bias the prongs of the plunger in opposite directions.

13. A method of securing a cable, comprising the steps of:
 a) providing a cable clamp including a retainer and a plunger, each of the retainer and the plunger including a central recess having a curved formation;
 b) placing a cable within the central recess of the retainer;
 c) aligning first and second prongs of the plunger with slots formed in the retainer, each prong having an interior side that faces the interior side of the other prong;
 d) interlocking the retainer and the plunger by pushing the first and second prongs of the plunger through the slots of the retainer to thereby secure the cable between the retainer and the plunger; and
 e) biasing each prong of the plunger in an outward direction opposite the interior side of the prong, each prong being biased toward retaining structure formed on the retainer.

14. The method of claim 13, wherein the step of providing the cable clamp includes providing a plurality of teeth on each prong of the plunger, the plurality of teeth being formed only on an exterior side of the prong, the exterior side being opposite the interior side.

* * * * *